V. H. FRAY 3,030,642

HEADING MACHINE WITH STOCK CUTTER MOUNTED
ON RECIPROCATING CROSS-HEAD

Filed July 31, 1958

3,030,642
HEADING MACHINE WITH STOCK CUTTER MOUNTED ON RECIPROCATING CROSSHEAD
Victor Hill Fray, Auckland, Auckland, New Zealand
(416 Remuera Road, Remuera, Auckland, New Zealand)
Filed July 31, 1958, Ser. No. 752,249
Claims priority, application New Zealand Feb. 11, 1958
4 Claims. (Cl. 10—15)

This invention relates to heading machines whereby heads are forged on round metal wire pieces for making blanks from which bolts, screws, rivets and the like are produced, the objects of the present invention being the provision of a series of improvements in and modifications of the heading machine the subject of my previous U.S.A. Patent No. 2,747,205 dated 29th May 1956, there being improved means for feeding the wire into the machine and for intermittently projecting such wire into position for cutting into wire pieces, improved means for cutting the wire into pieces and for carrying such pieces to position for insertion to a die, improved means for enabling easy adjustment of the ejector pins when producing various lengths of blanks, improved die block means and locking means therefore, improved means for effecting arcuate movements of the ejector, improvement in the construction of the indexing mechanism and means for adjustable mounting of the punches to the punch crosshead, such improvements and modifications enabling the machine to produce headed blanks in a more consistently satisfactory manner.

When, as in the original machine, the wire is cut into a number of wire pieces which are fed one at a time into the dies, the wire pieces are difficult to handle especially in the case of short wire pieces, so that problems arise and faults occur which detract from the consistent operation of the machine and after the machine has been in operation on the production of blanks of say 1½ inch length, it may then have to be changed to produce blanks for making ½ inch screws, whereby considerable time is involved in effecting the change of apparatus.

The present invention has accordingly been devised to effect improvements in mechanisms which in the original machine caused difficulty from time to time and to also effect some simplification of mechanism and to permit of more ready adjustment as required.

Broadly the invention comprises improvements in heading machines for bolts, screws, rivets and the like of the type described comprising means for feeding the wire into the machine and for intermittently projecting such wire into position for cutting into wire pieces, means for cutting the wire into pieces and for carrying such pieces to position for insertion to a die, means for enabling easy adjustment of the ejector pins when producing various lengths of blanks, improved die block means and locking means therefore, improved means for effecting arcuate movements of the ejector, improvement in the construction of the indexing mechanism and improved means for the adjustable mounting of the punches to the punch crosshead.

In describing the invention, reference will be made to the accompanying drawings in which.

In the invention, the machine retains its original major units of mechanism, there being a multi-punch carrying crosshead 1 and a multi-die carrying crosshead 2 slidable in guides 3 on a bedplate 4 with a crankshaft 5 rotatable in bearings 6 on the bedplate 4 for reciprocally moving the crossheads 1 and 2 in opposite directions, the rotatable die block in the die carrying crosshead 2 having a central shaft secured thereto for effecting rotation of same, said central shaft 7 being connected to indexing mechanism 8 for causing intermittent rotation thereof, there being also a side or cam shaft 9 extending alongside the bedplate 4 receiving drive through gearing 10 from an end of the crankshaft 5.

Instead of the wire which is to be formed into blanks passing into the heading machine from the crankshaft end thereof, such wire now passes to the machine from the opposite end thereof at which the indexing mechanism 8 is located.

To achieve the same mechanical movement of the indexing mechanism as previously, simplified indexing mechanism 8 is now applied in place of the previous rigidly secured crownwheel and bevel pinions or planet wheels, straight toothed gearing being used and these parts now being away from the centre line of the heading machine and housed within a gear box, casing or the like 11 (see FIG. 3) and at the outer end of this gear box 11 there is a drive shaft 12 which receives drive through bevel pinion gearing 13 and a right angle shaft 14 from the side or cam shaft 9, the shaft 14 being enclosed within a tubular cover or housing 15 and connected to the camshaft 9 by enclosing gearing (not shown).

Figures 3, 4:
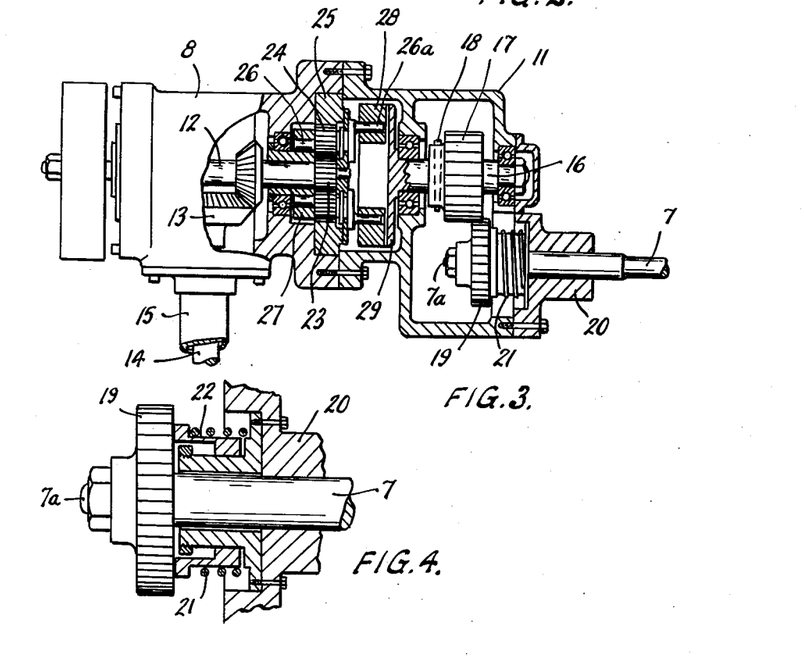
FIGURE 3 is a partially sectional elevation of the indexing mechanism.
FIGURE 4 is an enlarged sectional elevation of the buffer spring means of the indexing mechanism.

This shaft 12 through the indexing mechanism imparts the intermittent rotation with periods of dwell to what will be called the slide shaft 16, which is in line with the drive shaft 12 and mounted within the inner end of the gear box 11 to carry a wide toothed gear 17 which is preferably secured by a shear pin 18, the central shaft 7 of the header which carries the die block of the die crosshead 2 passing its outer end 7a into the gear box 11 and being slidable therein as well as rotatable, such outer end of the central shaft 7 having a narrow pinion 19 secured thereto which meshes with the wide pinion 17 of the slide shaft 16 so that it will remain in such mesh while effecting axial sliding movements.

Also disposed within the casing or gear box 11 over the central shaft 7 between its narrow pinion 19 and the bearing 20 of the shaft in the casing 11, there is a "holdback" or buffer compression spring 21, this applying its thrust on the pinion 19 through a slidable sleeve 22 and being for the purpose of effecting a holding back or buffer action on the die block through the central shaft 7 for purposes hereinafter mentioned.

Figure 10:
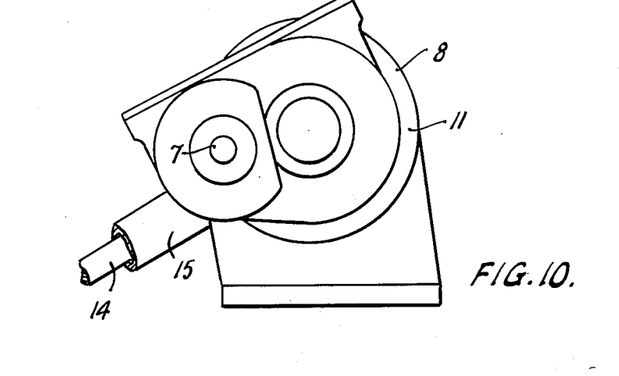
FIGURE 10 shows an end elevation of the indexing mechanism.

The mechanism between the drive shaft 12 and the slide shaft 16 for imparting intermittent rotation to the latter comprises a central sun gear 23 on the drive shaft 12 in mesh with several planet wheels 24 disposed around same which in turn mesh with an internally toothed gear ring 25 which is rigidly secured to the gear box 11, these planet wheels 24 each having crankshafts 26 secured thereto which are rotatable in a cage 27 which is rotatable over the drive shaft 12, the crankpins 26a of each crankshaft 26 projecting into blocks 28 which are radially slidable within radial slots or channels formed in a slide plate 29 which forms a part of the slide shaft 16.

The wire 30 which is to be formed into the blanks passes from the roll or coil of such wire to the indexing mechanism end of the heading machine, to firstly pass on to the additional apparatus provided which is somewhat like a capstan drum or winch drum 31, in that the wire 30 takes a turn around this drum 31 before continuing on to the feed mechanism.

This capstan drum 31 (see FIG. 1) is of narrow wheel form disposed on a horizontal shaft 31a mounted in bracket bearings 32 secured to the bedplate 4 to receive rotary drive as by skew gears 33 connecting it to the camshaft 9, this drum 31 having its periphery suited to effect a frictional grip on the turn of wire 30 which passes over it.

The wire 30 on leaving the capstan drum 31 may pass through known wire straightening apparatus (not shown) and then past the side of the indexing mechanism casing 11 to between two feed wheels 34 and 35 which are disposed one above the other with their peripheries coming together at the mid position between these (see FIGS. 11, 12 and 13), these upper and lower feed wheels 34 and 35 having peripheral grooves 36 therein which together will permit the wire to freely slidably pass therethrough where the wheels come together.

Figure 11:
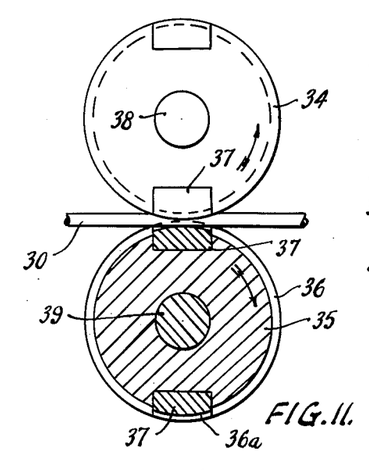
FIGURE 11 is a partially sectioned end elevation through the feed wheels.
Figure 12:
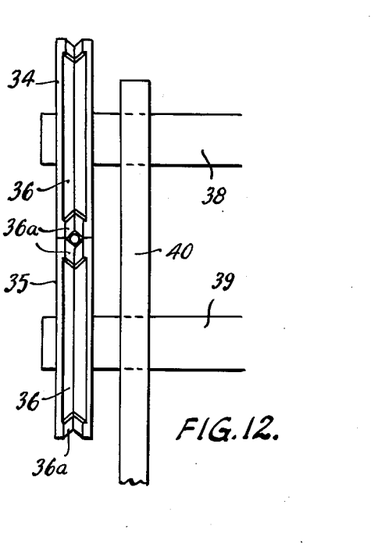
FIGURE 12 is an elevation of FIG. 11.
Figure 13:
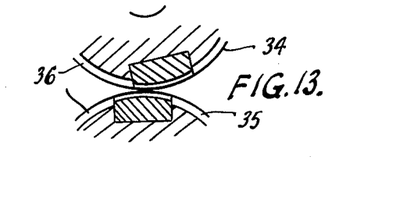
FIGURE 13 shows the feed wheels with the grips thereof out of register.

For the purpose of wire feed however, it is only necessary for these feed wheels 34 and 35 to intermittently grip and push the wire in the direction of the die crosshead 2 and for this purpose at portions of the wheels the grooves are made shallower or proud so that at such portions, the wire 30 would be gripped, the shallow groove or grip portions 36a being formed if so required in grip blocks 37 which are inset to the wheels 34 and 35.

Such feeds wheels 34 and 35 are rotated at like speed in opposite directions, their shafts 38 and 39 being supported in bearings 40 secured to the bedplate 4 and connected by gear wheels 41 for such purpose (see FIG. 1) the shaft 39 of the lower feed wheel 35 receiving a power drive as through skew gearing 42 from the cam shaft 9, the peripheral speeds of the feed wheels 34 and 35 and of the capstan drum 31 being the same.

The shallower groove or grip portions 36a of the grooves 36 of the feed wheels 34 and 35 are so positioned that during rotation of these wheels, a grip block 37 on one wheel 34 will coincide or register with a grip block 37 on the other wheel 35 as shown in FIG. 11, but by effecting only partial as against full register of the grips as shown in FIG. 13, such wheels 34 and 35 can be set to effect a long or a short amount of wire feed according to the lengths of the blanks to be produced.

Figure 6:
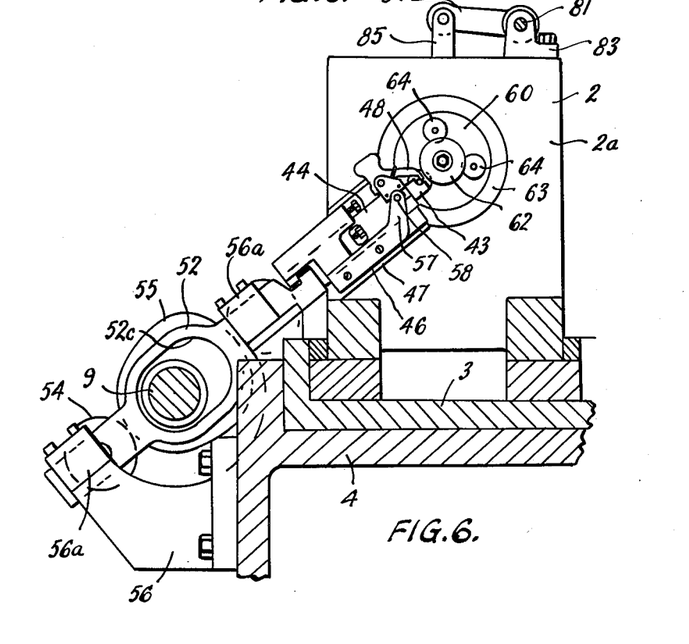
FIGURE 6 is an elevation of the wire cutting knife and the knife carrier and showing its relation to the die crosshead.

At the inner vertical face 2a of the die crosshead 2 there is the wire cutting knife mechanism, the knife 43 (see FIGS. 6 and 7) being adjustably mounted on a knife carrier 44 which is adapted for radial slidable movements in guides 45 and 46 secured to a base 47 which is rigidly secured to the die crosshead 2 so that the knife 43 and its associated parts are subject to the reciprocal travel of the die crosshead 2.

The base 47 to which the guides 45 and 46 are mounted is inset to the die crosshead 2 (see FIG. 5) so that the inner surface of the knife 43 will agree with the inner vertical face 2a of the die crosshead 2.

Figure 7:
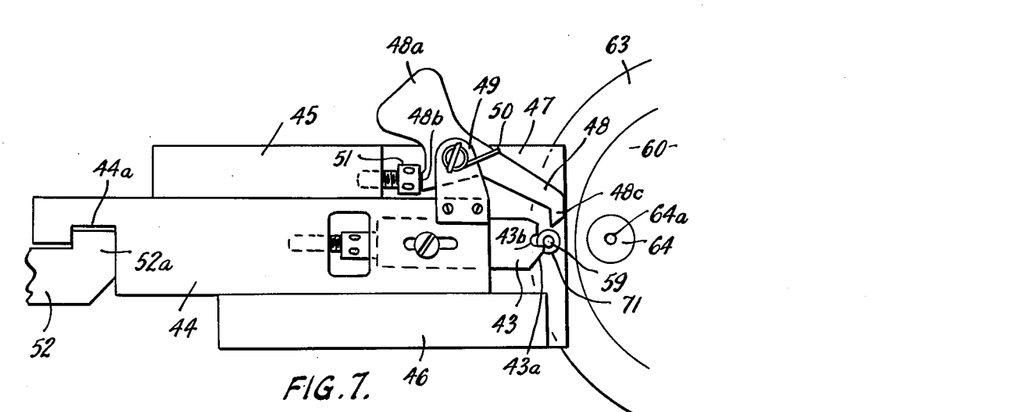
FIGURE 7 is an enlarged elevation of the knife and knife carrier, but with the stop bracket removed to enable the end of the knife and the shear die to be clearly seen.

A finger 48 which is pivotally mounted to a bracket 49 which is secured to the knife carrier 44 (see FIG. 7) is provided with a counterweight 48a opposite to such finger 48 so as to counteract inertia when moving at high speed, and includes a spring 50 which tends to move the finger 48 towards the end of the knife 43, the finger 48 including a contact pad 48b near its counterweight 48a, which is adapted to come to bear against an adjustable stop 51 which is secured to the upper guide 45 whereby, when the knife 43 is in an outer or withdrawn position as shown in FIG. 7, the finger tip 48c is moved away from the end 43a of the knife 43 in which the wire receiving recess 43b is disposed.

Figure 8:
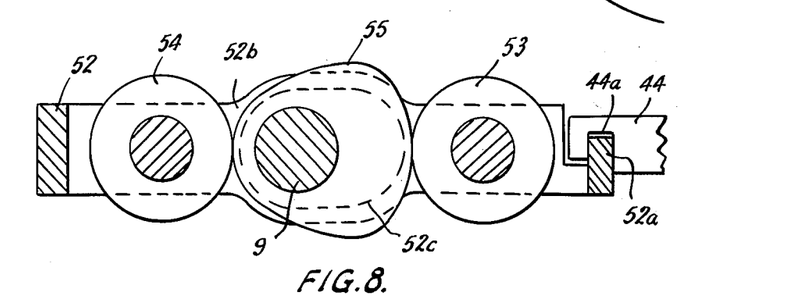
FIGURE 8 is an enlarged sectional elevation of the knife pusher but without its guide means.
Figure 9:
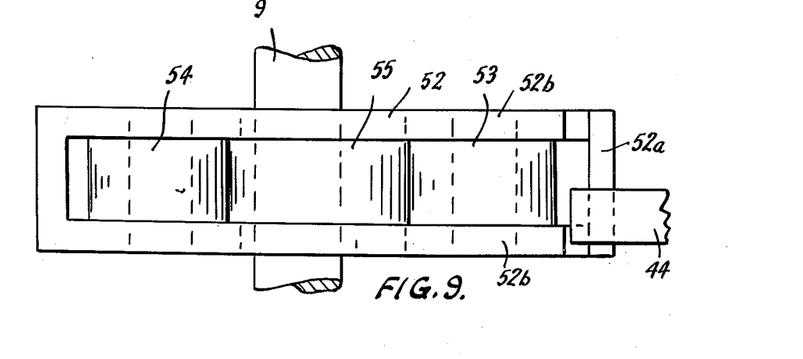
FIGURE 9 is a plan view of FIG. 8.

The knife pusher 52 which engages the outer end of the knife carrier 44 so as to impart the radial reciprocal movements to the latter and the knife carried thereby has a tongue 52a which is slidably engaged in a groove 44a formed in the outer end of the knife carrier 44 (see FIGS. 7, 8 and 9) so that a connection is maintained while the knife carrier 44 is effecting its horizontal travel along with the die crosshead 2.

The knife pusher 52 (see FIGS. 8 and 9) is in the form of two spaced apart connected bars 52b with front and rear rollers 53 and 54 rotatably mounted in the space between these, such rollers 53 and 54 being disposed at opposite sides of a cam 55 which is on the camshaft 9 which passes through oval holes 52c formed through the opposite bars 52b (with clearance) this cam 55 contacting both of the rollers 53 and 54 and its rotation causing thrust against one or the other of these to impart reciprocal movements to the knife carrier 52 in guides 56a (see FIG. 6) which are rigidly secured to a bracket 56 which is secured to the side of the bedplate 4 of the machine.

A stop bracket 57 is secured to the guide 46 of the knife carrier 44 (see FIG. 6) this including an adjustable stop screw 58 against which the end of the wire 30 comes to bear when projected through the die crosshead 2, this stop screw 58 being subject to the horizontal travel of the die crosshead 2 but not subject to the radial travel of the knife carrier 44 and therefore it is maintained concentric with the feed hole 59 through the die crosshead 2 and parts therein (see FIG. 5) through which the wire 30 passes on leaving the feed wheels 34 and 35.

Within the die crosshead 2 there is the die block 60 (see FIG. 5) this being secured to the inner end 7b of the central shaft 7 as by a setscrew 61 and washer 62 from the front face 60a of the die block 60, a sleeve 63 rigidly secured in the die crosshead 2 having the die block 60 rotatable therein, the front face 60a of the die block 60 being flush with the inner end face 2a of the die crosshead 2.

Figure 5:
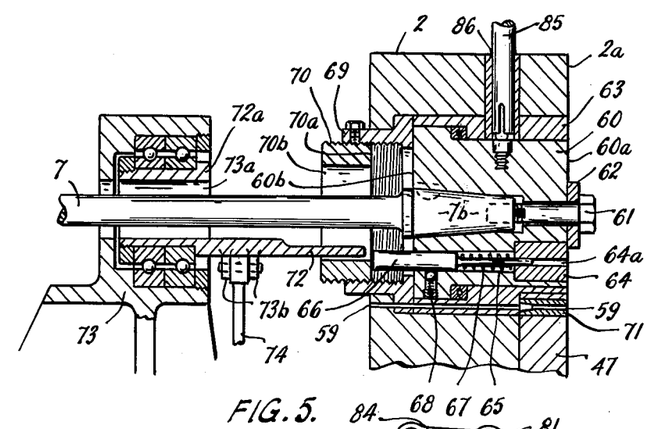
FIGURE 5 is an enlarged sectional elevation through part of the die crosshead and the ejector carrying bearing.

The washer 62 is of such diameter as to engage and hold in place the dies 64 which are set into the die block 60, the bores 64a of these dies 64 being concentric with the ejector pin bores 65 which extend through to the rear face 60b of the die block 60.

Ejector pins 66 having small ends and large ends are slidable within the bores 64a and 65 respectively, compression springs 67 being disposed in each of the bores 65 to yieldingly tend to hold the ejector pins 66 in inward position as shown in FIG. 5 and each ejector pin 66 may also have a spring ball stop 68 bearing against the rear large end thereof.

Rigidly secured in the die crosshead 2 behind the rear face 60b of the die block 60 there is an internally threaded socket 69 and into this adjustably screws a stop sleeve or backing ring 70 which presents an inner face 70a against which the rear large ends of the ejector pins 66 are adapted to be thrust by the compressions springs 67, the sleeve 70 having a large bore 70b to permit of clear passage of the central shaft 7 therethrough and also passage of the ejector.

The provision of this adjustable backing ring 70 against which the large ends of the ejector pins 66 bear, enables easy adjustment of the positions of the ejector pins 66 for various lengths of blank to be produced, the backing ring 70 being screwed inwardly to the thread socket 69 for short length blanks and outwardly for the longer blanks whereby the small ends of the ejector pins 66 located within the die holes 64a are a shorter or a longer distance from the face 60a of the die block 60.

The feed hole 59 passes through part of the die crosshead 2, then through near the edge of the sleeve 63 and through a shear die 71 which is set into the base 47 of the guides 45 and 46, whereby the wire 30 fed through such feed hole 59 is brought to a position which is outward from the die block 60 as shown in FIG. 7 and is in the line of travel of the knife 43.

The ejector 72 (see FIG. 5) which is adapted to alternately engage the rear large ends of the ejector pins 66 is required to effect arcuate swing as previously and forms a part of a sleeve 72a which is rotatably carried but held from axial travel in a pedestal bearing 73 which is rigidly secured to the bedplate 4, the sleeve bore 73a being concentric with the central shaft 7 which passes through such bore 73a with clearance.

A pair of lugs 73b project from a point on the ejector 72 near the sleeve 72a to pivotally carry one end of a connecting rod 74 which at its other end is pivotally secured to an arm of a bellcrank 75 (see FIG. 1) which is pivotally mounted to the bedplate 4, the other or free arm 75a of the bellcrank 75 extending to a position which brings it to between two oppositely disposed adjustable stop screws 76 and 77 which are spaced apart on a bar like bracket 78 which is secured to the die crosshead 2 and extends rearward therefrom at a side thereof, these stop screws 76 and 77 being adapted to alternately engage opposite sides of the free arm 75a of the bellcrank 75.

Figure 14:
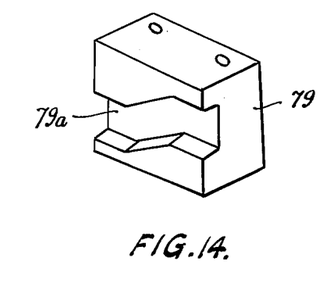
FIGURE 14 is a perspective view of the cam plate.

A simplified form of locking mechanism for the die block 60 comprises a plate cam 79 of a ramp like slot form (see FIG. 14) secured on top of the punch crosshead 1 and engaging the slot 79a of this plate cam 79 there is the spherical or barrel shaped end of a lever arm 80 (see FIG. 1) which is secured at one end of a horizontal shaft 81 which is rotatably supported on bearings 82 and 83 which are secured on top of the die crosshead 2 near its opposite ends.

This shaft 81 extending parallel with the centre line of the machine and above the punch and die crossheads 1 and 2 is therefore carried by the die crosshead 2 alone although the lever arm 80 at one of its ends is slidable in the slot 79a of the plate cam 79 carried by the punch crosshead 1.

Figure 15:
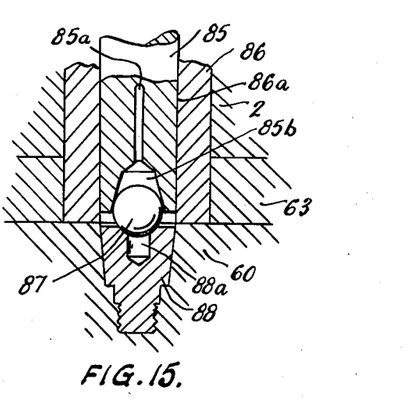
FIGURE 15 shows an enlarged sectional elevation of the bottom end of the plunger rod and its relation to the die block.

At the die block end of the shaft 81 it carries a further lever arm 84 which at its outer end extends to a central position above the die block 60, there being a vertical plunger 85 pivotally secured to the free end of this lever arm 84 extending down through a bore 85a in a sleeve 86 in the die crosshead 2 to the die block periphery (see FIG. 15).

The bottom end of this plunger rod 85 is longitudinally split 85a and in such bottom end there is a conical bore 85b in which a metal ball 87 fits, this ball 87 on being subject to any inward thrust to the conical bore 85b tending to cause expansion of the bottom end of the plunger 85.

This ball 87 is also adapted to engage in indents formed in the periphery of the die block 60 in a ball-stop manner and these indents in the die block 60 may be provided as by removable screws 88 fitted into the die block 60 with conical recesses 88a in their heads for the partial entry of the ball 87 thereto.

For the purpose of enabling easy adjustment of the positions of the punches 89 on the punch crosshead 1, punch carriers 90 are mounted on such crosshead 1 for holding the punches 89, these punch carriers 90 comprising a base or block of oblong form 91 adapted for securement flat against the end face 1a of the punch crosshead 1 (see FIGS. 16, 17 and 18) with a hole 91a formed in the block 91 into which the punch 89 is a slidable fit to be secured in place by a setscrew 92 in the block 91 bearing against the punch 89.

Figure 16:
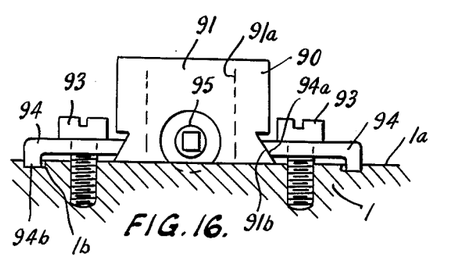
FIGURE 16 shows an end elevation of a punch carrier.
Figure 17:
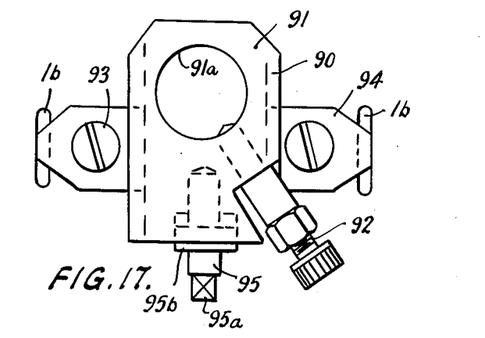
FIGURE 17 is a plan view of FIG. 16.
Figure 18:
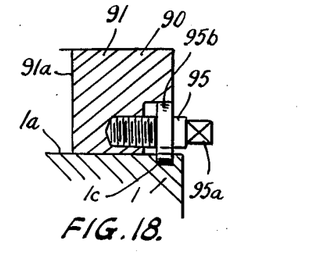
FIGURE 18 is a partial sectional elevation of the punch carrier.

Each block 91 is secured in place on the flat end face 1a of the punch crosshead 1 by two setscrews 93 screwing into the latter through two clamping plates 94 which are disposed at opposite sides of the block 91, these opposite sides of the block 91 having bevelled faces 91b as of slide form which are engaged by complementary bevelled faces 94a on the inner ends of the clamping plates 94, the outer ends of the latter having downwardly turned lips 94b which are adapted to be slidable along shallow slots 1b which are cut into the flat ends 1a of the punch crosshead 1, the arrangement being such that these clamping plates 94 will enable the block 91 to be adjustably moved in lateral directions and to be clamped in position.

For longitudinal direction movements of the blocks 91 they have shouldered adjustment screws 95 screwing into an end thereof with an outer end 95a suited for receiving a spanner or key which will effect adjustment rotation of the screw 95, the shoulder 95b on such screw 95 located between its opposite ends being adapted to rotatably engage within a recess 1c formed in the flat end 1a of the punch crosshead 1.

In use or operation, as the cycle of operation of the machine is substantially the same as that described in my previous patent specification, it is not necessary to describe the cycle of operation of the old parts in full detail, but only the operation of the newly introduced units of mechanism.

Briefly therefore, it can be said that the rotation of the crankshaft 5 causes the punch crosshead 1 and the die crosshead 2 to move reciprocally in opposite directions whereby the punches 89 and the dies 64 are moved towards and away from each other and each time the crossheads 1 and 2 move away from each other the die block 60 within the die crosshead 2 is rotated 120 degrees whereby the three dies 64 are carried around to in line with each of the three punches 89 in turn so that a wire piece is first inserted to a die 64 by one punch 89, is carried around to the next position to be struck a first head forging blow by the second punch, is carried around to the next position to be struck a second head forging blow by the third punch and is then ejected as a headed blank.

With the capstan drum 31 and the feed wheels 34 and 35 in rotation, on each occasion when the grip blocks 37 of the wheels coincide (or partially coincide) they will grip and push a length of wire 30 through the feed hole 59 in the die crosshead 2, this feed effected by the feed wheels 34 and 35 being assisted by the capstan drum 31 which takes the main load of unwinding the wire 30 from the heavy coil of same this being effected in a manner similar to the passing of a coil or turn of rope over a capstan or winch drum, in that only when the feed wheels 34 and 35 effect a pull on the wire 30, as caused by the shallow grip portions 36a, such pull is transmitted back to the turn of wire on the capstan drum 31 so that such turn of wire 30 is tightened on the drum 31 whereby the latter feeds as much wire to the feed wheels 34 and 35 as required and no more, with the main load occasioned by the unwinding of the coil of wire taken by the capstan drum 31 alone.

Figure 1:
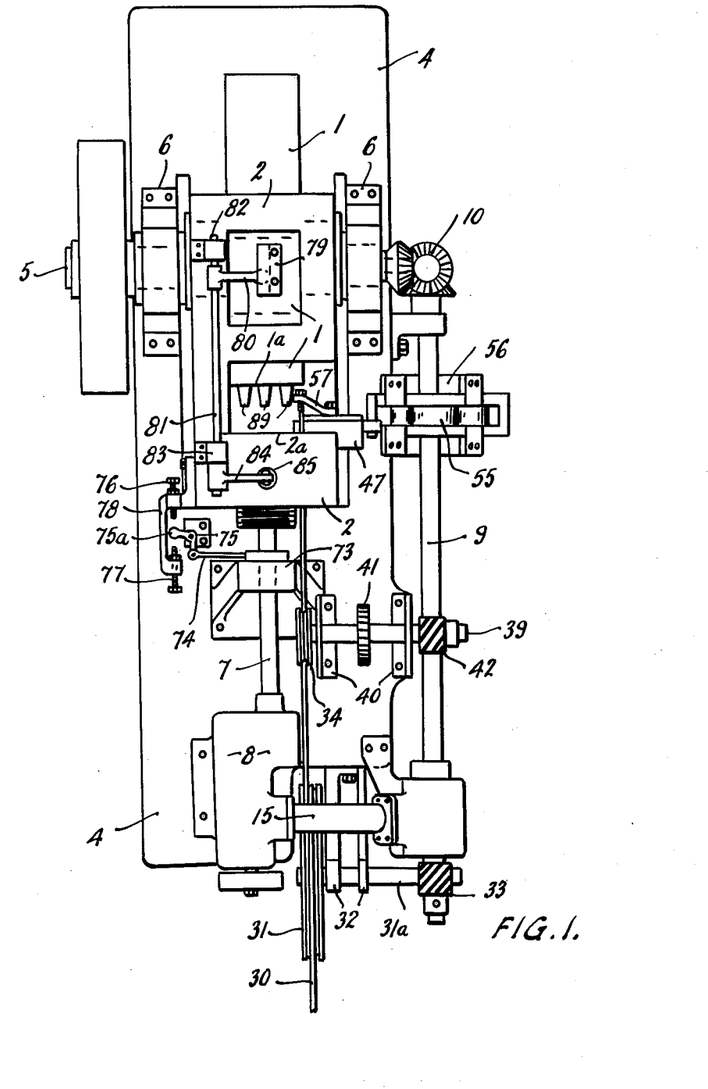
FIGURE 1 shows a plan view of the complete machine.
Figure 2:
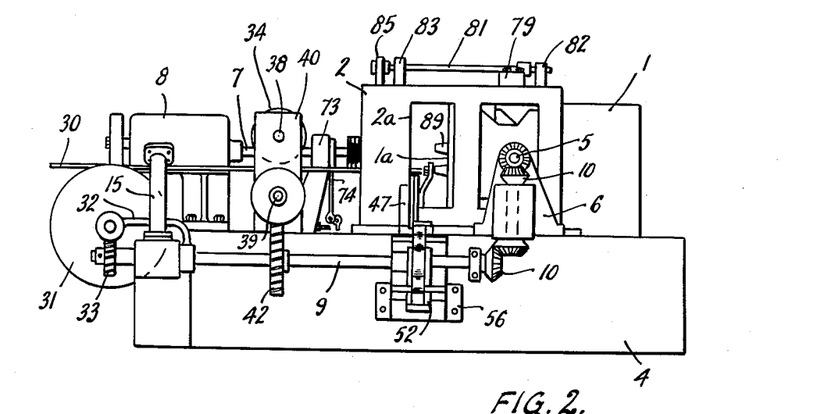
FIGURE 2 is an elevation of the machine at its camshaft side.

At the commencement of inward travel of the punch and die crossheads 1 and 2 towards each other, with the required length of wire 30 projecting from the shear die 71 at the outlet end of the feed hole 59 through the die crosshead 2 up to the stop 57 as shown in FIGS. 1 and 2, the knife 43 which is in the withdrawn position as shown in FIG. 7 commences to move inwardly.

In such withdrawn or outer position, the contact pad 48b on the finger 48 by being in contact with the adustable stop screw 51 is holding the finger 48 in an open position whereby the finger tip 48c is clear of presenting an obstruction to the path of the wire 30 up to the stop 57, but as the knife commences to move, the pad 48b moves clear of the stop screw 51, whereby the finger 48 is moved by the spring 50 so as to pass to the opposite side of the wire to that of the knife 43 and to cause its tip 48c to press the wire piece against the knife recess 43b, which by being moved by its knife pusher 52, cuts off the projecting piece of wire from that remaining in the feed hole 59 up to the shear die 71 therein, the finger 48 and knife 43 holding the wire piece while it is carried into position for insertion to the first die 64.

With the finger 48 provided with a counterweight 48a, the inertia caused by high speed movements does not have any undesired moving influence on the finger 48, so that the spring 50 along with the contact pad 48b and the adjustable stop 51 control the movements of the finger 48.

With three punches 89 on the end face 1a of the punch crosshead 1, one of these will always be in line with the particular die 64 of the three of these which is for the time being in the position as shown in FIG. 7, radially in line with the shear die 71 and the knife 43, this punch 89 always effecting a wire piece inserting operation only, the other two punches 89 being shaped to effect head forging and for this purpose their exact location on the punch crosshead 1 is important.

Therefore the punch carriers 90 may be provided only in respect of the two head forging punches 89 and not for the inserting punch.

When the position of a head forging punch 89 requires adustment, this is effected by moving the block 91 to which the punch 89 is mounted, the setscrews 93 of the clamping plates 94 being slackened off to allow of lateral direction movement of the block 91, while rotation of the adjustment screw 95 effects longitudinal direction movement of the block 91, with final re-tightening of the setscrews 93 securing the block 91 and punch 89 in the adjusted position.

With the ejector pins 66 now provided with spring balls 68 and the compression springs 67, they are not now free to effect inertia caused movements when the die block 60 in which they are housed is making high speed reciprocal movements, the ejector pins 66 also being restrained from inertia caused movements on such occasions when, for any reason, wire pieces are not being inserted to the dies 64.

As there is a tendency for the forging blows to cause hard thrust of the ejector pins 66 in inward direction to against the backing ring 70 through the wire pieces being forged into headed blanks, this has a tendency to cause hard rotation resistance of the die block 60.

This undesired resistance or jambing action is overcome by the provision of the buffer spring 21 in the indexing mechanism 8 whereby, when the punch and die crossheads 1 and 2 are approaching each other, at the termination of this movement which is causing the central shaft 7 to be projected from the gear box 11, a buffer or recoil action is caused by the compression spring 21 in its resistance to being compressed and this causes the die block 60 to be held back at the time of the forging blows to a small extent whereby some amount of slack will remain between the die block 60 and the die crosshead 2 and also between the ejector pins 66 and the backing ring 70 during the return travel of the block 60.

The mechanism for locking the die block 60 to the die crosshead 2 comes into operation at each interval of pause in the rotation of the die block 60 in the die crosshead 2 as caused by the central shaft 7 and indexing mechanism 8, the effect of this operation being the same as previously.

The improved mechanism however effects the locking in an improved more positive manner, in that when the plunger 85 is moved downward as caused by the travel of the spherical or barrel shaped end of the lever 80 over the plate cam 79 on the punch crosshead 1 effecting partial rotation of the shaft 81 and rocking of the further lever 84 on such shaft 81 which is connected to the plunger 85, the ball 87 in the bottom conical bore 85b on bearing in the unyielding recess 88a of the screw 88 of the die block 60 causing it to be thrust into the conical bore 85b and as the bottom end of the plunger 85 has the longitudinal splits 85a therein, this bottom end is expanded a small amount to thus obtain a jambing grip on the bottom end of the bore 86a in the sleeve 86, with the result that locking is effected directly at the position where it is most effective.

On the instant when the plunger 85 moves upwardly, the pressure on the ball 87 is released and so the expansion of the bottom end of the plunger 85 also ends to give freedom for upward travel of the plunger.

On outward travel of the die crosshead 2, the ejector pin 66 of the particular die 64 which is holding a finished blank ready to be ejected therefrom encounters the ejector 72 and while the contact of the ejector 72 with the ejector pin 66 is sufficient to cause the ejector to take up the same rotation as being effected by the ejector pin along with the die block 60, this rotation or arcuate swing of the ejector 72 is positively effected by the sleeve 72a being partly rotated, this being effected by one of the stop screws 76 and 77 on the bracket 78 extending from the rear and side of the die crosshead 2 contacting the free arm 75a of the bellcrank 75, whereby the latter is moved to in turn move the connecting rod 74 which turns the sleeve 72a and the ejector 72 thereon at a like speed to that of the rotation of the die block 60.

At the end of the arcuate swing of the ejector 72, it has caused the ejector pin 66 to push the finished blank out of the die block 60 and as the ejector 72 has to be swung back to be ready to engage the next ejector pin 66, the other stop screw on the bracket 78 on inward travel of the die crosshead 2 engages the free arm 75a of the bellcrank 75, so that through the latter and the connecting rod 74 the ejector 72 is turned back to starting position.

Although the die block 60 is described and shown in the drawings as being provided with three dies 64 and the punch crosshead 1 with three punches 89, there are cases where the blanks to be produced may be such that it would be preferable to have four or some other number of the dies 64 to the die block 60 with a corresponding number of punches 89 on the punch crosshead 1.

In the indexing apparatus 8 as shown in the drawing, this has been designed for three dies 64, it being required to transmit the intermittent drive to the central shaft 7 whereby the latter and the die block 60 is rotated a third of a revolution and then dwells or pauses so that in one revolution of the die block 60 there are three intervals of dwell during each of which one punch effects wire piece insertion to a die while the other two punches effect at the same time head forging blows.

The slide shaft 16 and the central shaft 7 are therefore effecting like rotation, the wide toothed gear 17 on the former and the narrow pinion 19 on the central shaft 7 being of same size, but obviously, there could be a difference in the sizes of these gears 17 and 19 so that a reduction of speed of the central shaft 7 is effected whereby while the slide shaft 16 effects one third of a revolution between its intervals of dwell, it transmits only one quarter of a revolution to the central shaft 7, so that for each complete revolution of the central shaft 7 it will have four intervals of dwell, thus enabling the use of four dies and four punches.

If so desired, the indexing mechanism 8 could be designed to produce quarter revolutions and four intervals of dwell by alteration of the gear ratios of the sun and planet wheels 23 and 24 and the gear ring 25, but it has been found in practice that when the indexing mechanism 8 produces only the three periods of dwell, these are more sustained than if designed to produce four or some other number of dwell periods and that it is therefore better to effect what changes of speed of rotation of central shaft 7 in relation to the slide shaft 16, by change of the ratio of the gears 17 and 19.

I claim:

1. In a heading machine for bolts and the like, having a die cross-head, a punch cross-head, and means for causing relative reciprocation of the cross-heads toward and away from one another, guides mounted on one of the cross-heads, a cut-off knife mounted in the guides for reciprocation transversely of the cross-head reciprocation, and means for reciprocating the cut-off knife in timed relationship to the cross-head reciprocation.

2. A wire cutting mechanism comprising a knife provided with a cutting groove support, means supporting said knife for reciprocating movements, a finger pivoted on said means and including an operative portion adapted for being moved into operative position adjacent said groove, resilient means engaging said finger and urging said portion into said operative position, inertia responsive means connected to said finger and opposing action of said resilient means in response to selected of said reciprocating movements, a pad connected to said inertia responsive means, and an adjustable stop on the support means to engage the pad to limit movement of said finger.

3. A mechanism as claimed in claim 2 wherein said inertia responsive means is a weight connected to said finger.

4. A mechanism as claimed in claim 2 comprising a hook-shaped member engaging the first said means, a rotatable cam adjacent said member, and a cam follower on said member and engaging said cam.

References Cited in the file of this patent

UNITED STATES PATENTS

| | | |
|---|---|---|
| 1,015,382 | Duston | Jan. 23, 1912 |
| 1,437,919 | Smith | Dec. 5, 1922 |
| 1,961,442 | Johnson | June 5, 1934 |
| 2,149,578 | Carney | Mar. 7, 1939 |
| 2,199,241 | Hoffert | Apr. 30, 1940 |
| 2,695,060 | Girz | Nov. 23, 1954 |
| 2,730,731 | Schoeffer | Jan. 17, 1956 |
| 2,747,205 | Fray | May 29, 1956 |
| 2,854,861 | Loder | Oct. 7, 1958 |